May 9, 1939.   O. FISCHER   2,157,660
PHOTOELECTRIC EXPOSURE METER
Filed Nov. 28, 1936
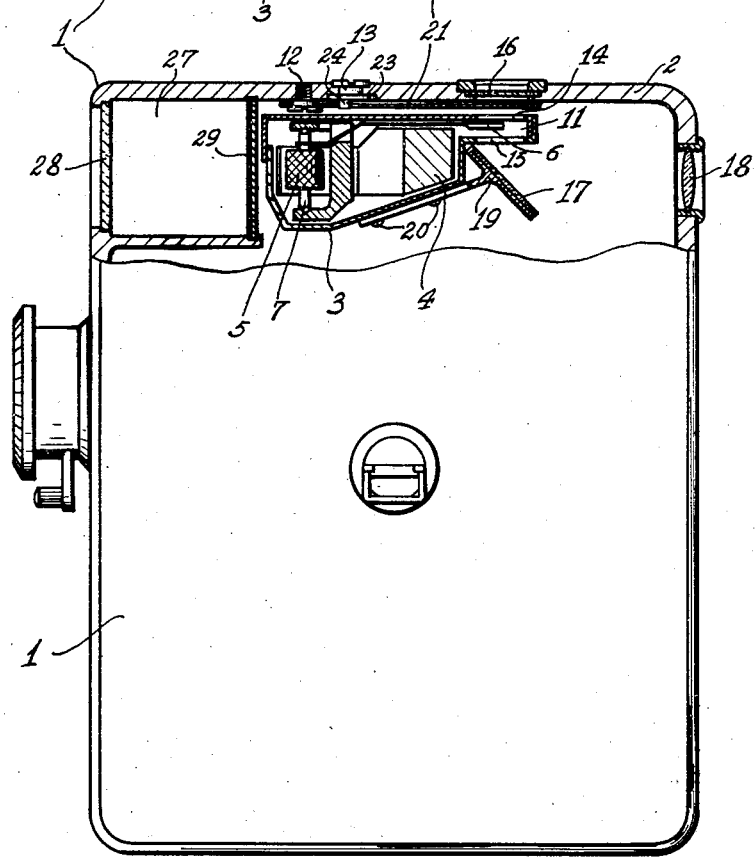
Inventor
Otto Fischer
by B. Singer
Attorney:

Patented May 9, 1939

2,157,660

UNITED STATES PATENT OFFICE 2,157,660

PHOTOELECTRIC EXPOSURE METER

Otto Fischer, Dresden, Germany, assignor to Zeiss Ikon Aktiengesellschaft, Dresden, Germany Application November 28, 1936, Serial No. 113,224
In Germany November 28, 1935

6 Claims. (Cl. 88—23)

The invention relates to photoelectric exposure meters and particularly relates to an exposure meter of that type which is mounted on or combined with a photographic camera or a motion picture camera.

It is an object of the invention to provide a photoelectric exposure meter with a measuring instrument which is adapted to be combined with a camera in such a way, that it is possible to read the measuring instrument either from the rear of the camera in eye level height or from above by looking downwardly through a window arranged in a horizontal plane, as for instance in the top wall of the camera.

Another object of the invention is to provide the measuring instrument of the exposure meter with a dial or scale which is mounted outside of the casing of the measuring instrument and separate therefrom.

A further object of the invention is to support the dial or scale of said measuring instrument independently of the casing of said measuring instrument within the camera casing and make the dial or scale readily adjustable from the outside of the camera casing for the purpose of readjusting the zero mark of the scale.

In accordance with another object of the invention the dial of the measuring instrument is made of transparent material and a reflecting member is provided for illuminating the transparent dial and for permitting an indirect reading of the same at a right angle with respect to the direction of direct reading of the scale.

With these and other objects in view the invention consists in the combination and arrangement of parts hereinafter described and claimed.

The drawing shows by way of example a combination of the photoelectric exposure meter of the invention with a motion picture camera.

Fig. 1 is a top plan view of a motion picture camera with a portion of the top wall of the camera casing broken away to show the arrangement of the measuring instrument of the exposure meter, and Fig. 2 is a side elevation view of the motion picture camera with the upper portion thereof including the measuring instrument in section.

The measuring instrument of the photoelectric exposure meter is arranged within the upper portion of the camera casing 1 spaced slightly from the top wall 2 thereof. The casing 3 of the measuring instrument containing the permanent magnet 4, the rotatable armature 5 and the pointer 6 which is attached to the armature shaft 7, is secured by screws 8 or the like to a mounting plate 9 which in turn is secured to the inner face of the side wall 10 of the camera casing 1. It will be noted that the screws 8 extend through the wall of the instrument casing 3 and into the permanent magnet 4 to hold the same securely in position.

The instrument casing 3 is provided with a rearward extension 11 into which the free end of the pointer 6 extends. The top and bottom walls respectively of this casing extension 11 are each provided with an aperture 14 and 15 respectively through which the pointer 6 is visible. The top wall 2 of the camera casing 1 above the aperture 14 is provided with a window 16. A reflecting member 17, as a mirror or the like, is arranged below the aperture 15 and is positioned at such an angle that it reflects light rays entering the window 16 and passing through the apertures 14 and 15 rearwardly toward an observation lens 18 in the rear wall of the camera casing. The reflecting member 17 is mounted on a bracket 19 attached to the bottom wall of the instrument casing 3 at 20.

The top wall of the measuring instrument casing 3 is slightly spaced from the inner face of the top wall 2 of the camera casing. In this space, and attached to the camera wall 2 is arranged a transparent dial plate 21 having scale divisions 22 thereon, which are directly visible through the window 16 and which cooperate with the free end of the movable pointer 6 When looking through the lens 18 an image of the scale divisions 22 and of the free end of the pointer 6 will be observed on the reflecting member 17. When looking into the window 16 from above, the pointer 6 and the scale divisions 22 are observed directly, whereby the mirror 17 illuminates the transparent dial from below. The dial plate 21 is attached to the inner face of the camera wall 2 by a shouldered pin or screw 12 which is positioned in axial alinement with the armature shaft 7. For the purpose of rotatably adjusting the dial 21 about the axis of the pin 12 there is provided in the top wall 2 of the camera casing a rotatable adjusting member 13 carrying on its inner end a disc 23 with an eccentric pin 24 thereon. The outer end of the member 13 is provided with a slotted head adapted to be engaged by a screw driver or the like. The eccentric pin 24 extends into an oblong aperture 25 of the dial plate 21 and upon rotation of the adjusting member 13 the dial 21 will be moved about the axis of the pin 12. This adjustment of the dial is provided for resetting the zero mark 26 of the scale if this should become necessary for any reason whatever.

In the embodiment shown by example in the drawing, the photoelectric cell 29 is arranged at the rear end of a chamber 27 at the top portion of the camera casing 1 in front of the measuring instrument. The front end of the chamber 27 is closed by a clear glass plate 28.

What I claim is:

1. In combination, a photoelectric exposure meter provided with a measuring instrument, a camera having a top wall and a rear wall, said measuring instrument being positioned within said camera and including a movable pointer and a flat dial plate arranged in a plane parallel to one of said walls, a window in said last named wall and directly over the graduated face of said dial plate means within said camera for reflecting an image of said graduated face of the dial plate and a portion of said pointer toward the other one of said walls, and a window in said last named wall for viewing said reflected image.

2. In combination, a photoelectric exposure meter provided with a measuring instrument, a camera having a top wall and a rear wall, said measuring instrument having a movable pointer and a transparent dial and being positioned in the upper portion of said camera, a window in said top wall and directly above the scale divisions of the said dial of said measuring instrument, means within said camera and below the scale divisions of the said dial for reflecting the indication of said measuring instrument toward said rear wall, and means in said rear wall to permit the observation of the reflected indication of said measuring instrument.

3. The combination of a photoelectric exposure meter provided with a measuring instrument, with a photographic or motion picture camera having a top wall and a rear wall, said measuring instrument being arranged within said camera below the top wall thereof and including a casing and a separate transparent dial supported independently of said casing on the inner face of the said top wall of the camera, a window in said top wall for directly observing and reading said measuring instrument from above, a reflecting member positioned below said transparent dial for reflecting the indication of said measuring instrument toward the rear wall, and means in said rear wall for permitting the reading of the reflected indication of said measuring instrument from the outside of said camera.

4. The combination of a photoelectric exposure meter provided with a measuring instrument, with a photographic or motion picture camera having a top wall and a rear wall, said measuring instrument being arranged within said camera below the top wall thereof and including a casing and a separate transparent dial supported independently of said casing on the inner face of the said top wall of the camera, means adapted to adjust the position of said dial from the outside of said camera, a window in said top wall for directly observing and reading said measuring instrument from above, means within said camera and below said transparent dial for reflecting the indication of said measuring instrument toward the rear wall, and means in said rear wall for observing said reflected indication.

5. The combination of a photoelectric exposure meter provided with a measuring instrument, with a photographic or motion picture camera having a top wall and a rear wall, said measuring instrument being arranged in the upper portion of said camera and including a casing and a separate transparent dial supported independently of said casing on the inner face of one of said walls of the camera, a rotatable member extending through said last named wall and engaging said dial and adapted to adjust the position of the same, a window in said last named wall for directly observing and reading said measuring instrument, means within said camera and in axial alinement with said window for reflecting the indication of said measuring instrument toward the other one of said walls, and means in the said other wall for observing said reflected indication.

6. The combination of a photoelectric exposure meter provided with a measuring instrument, with a photographic or motion picture camera having a top wall and a rear wall, said measuring instrument being arranged within said camera below the top wall thereof and including a casing, a rotatable pointer and a transparent dial, said dial being supported independently of said casing on the inner face of the top wall of said camera and being rotatably adjustable about the axis of rotation of said pointer, a rotatable member extending through said top wall and having at its inner end an eccentric projection engaging said dial for adjusting the same when said rotatable member is manually rotated, a window in said top wall for directly observing and reading said measuring instrument from above, a reflecting member positioned below said transparent dial for reflecting the indication of said measuring instrument toward the rear wall, and means in said rear wall for permitting the observation of said reflected indication from the outside of said camera.

OTTO FISCHER.